June 6, 1933.  W. L. PAUL ET AL  1,912,998
STALK CUTTING MECHANISM FOR CORN HARVESTERS
Filed May 14, 1928  3 Sheets-Sheet 2
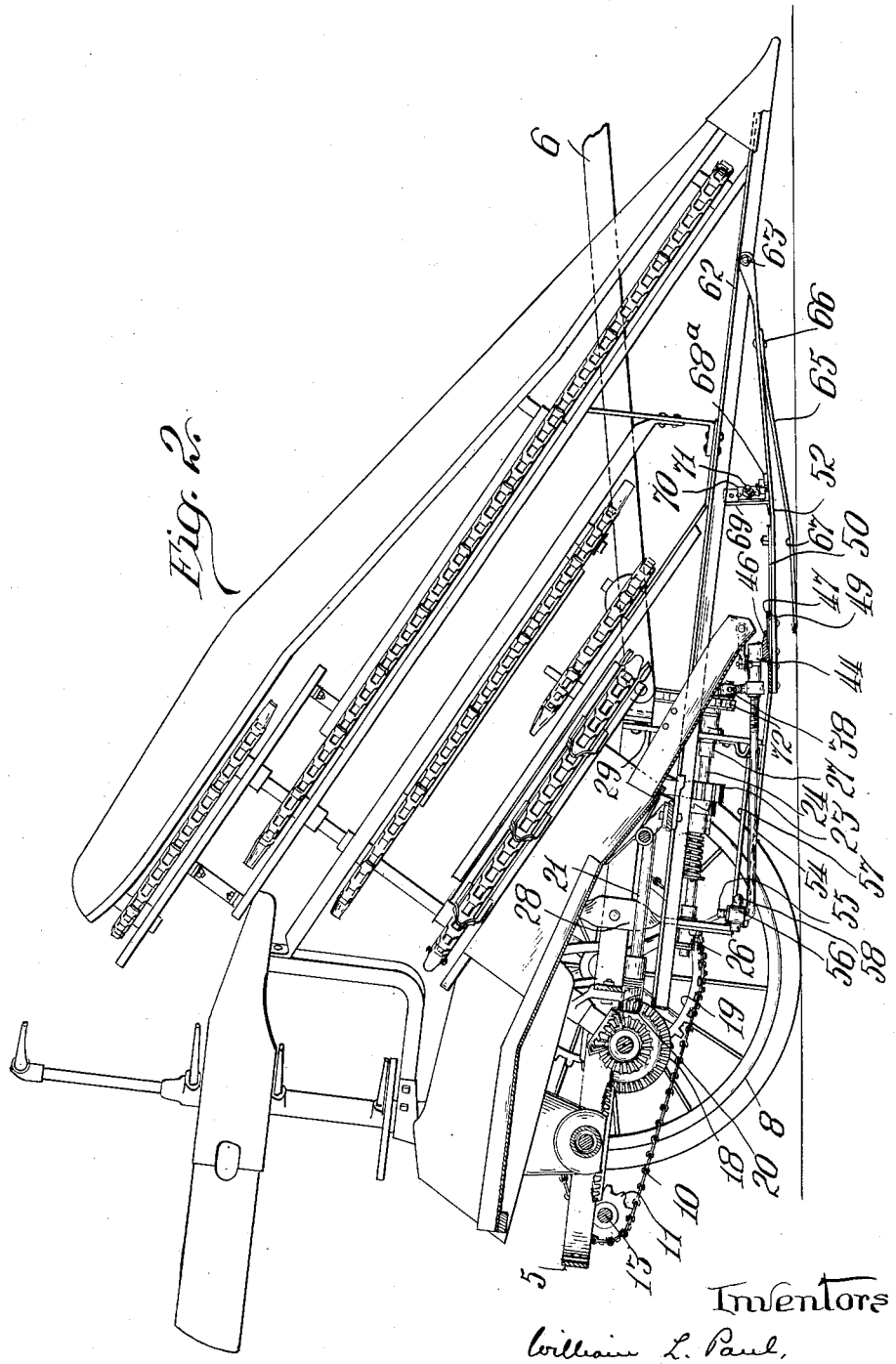

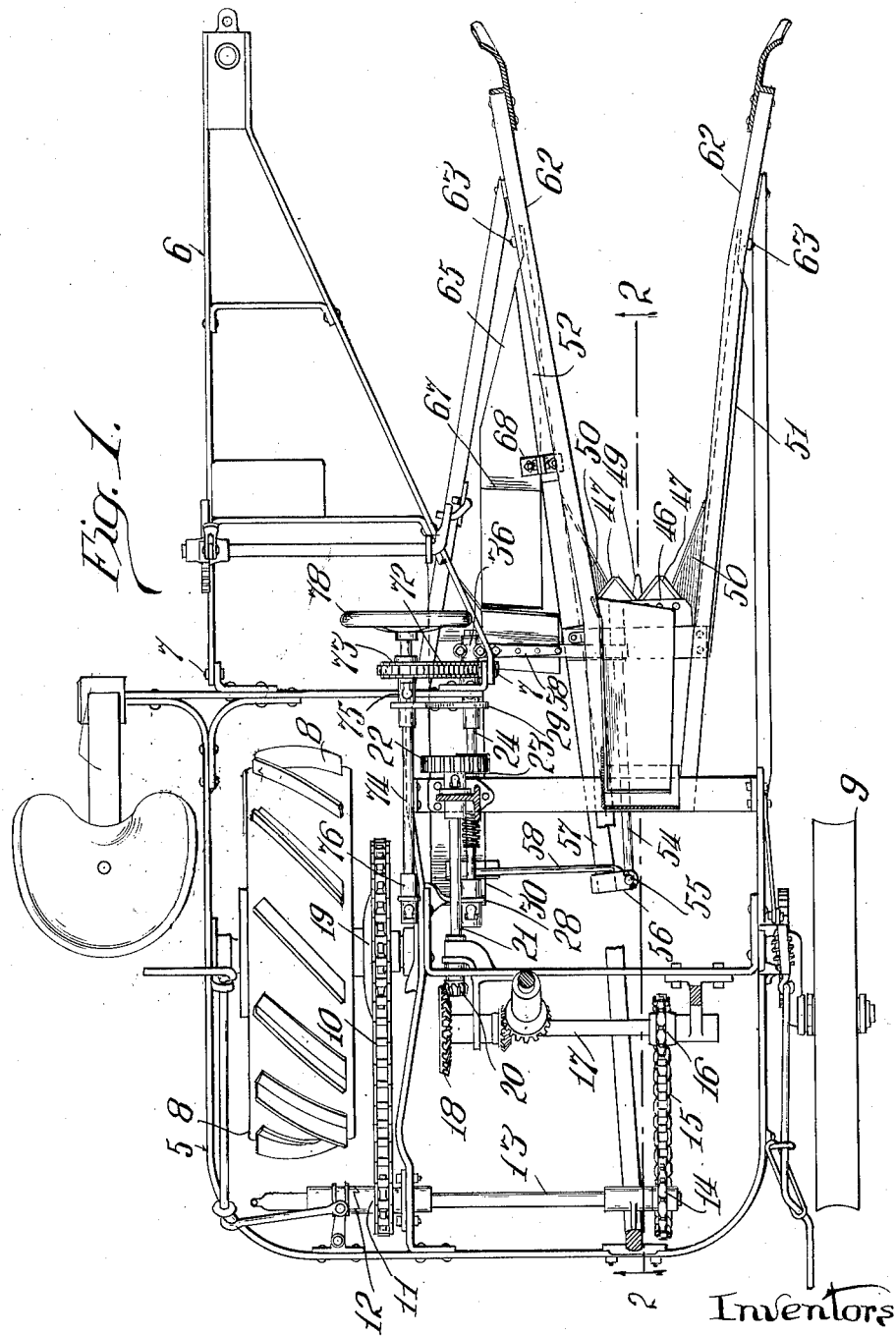

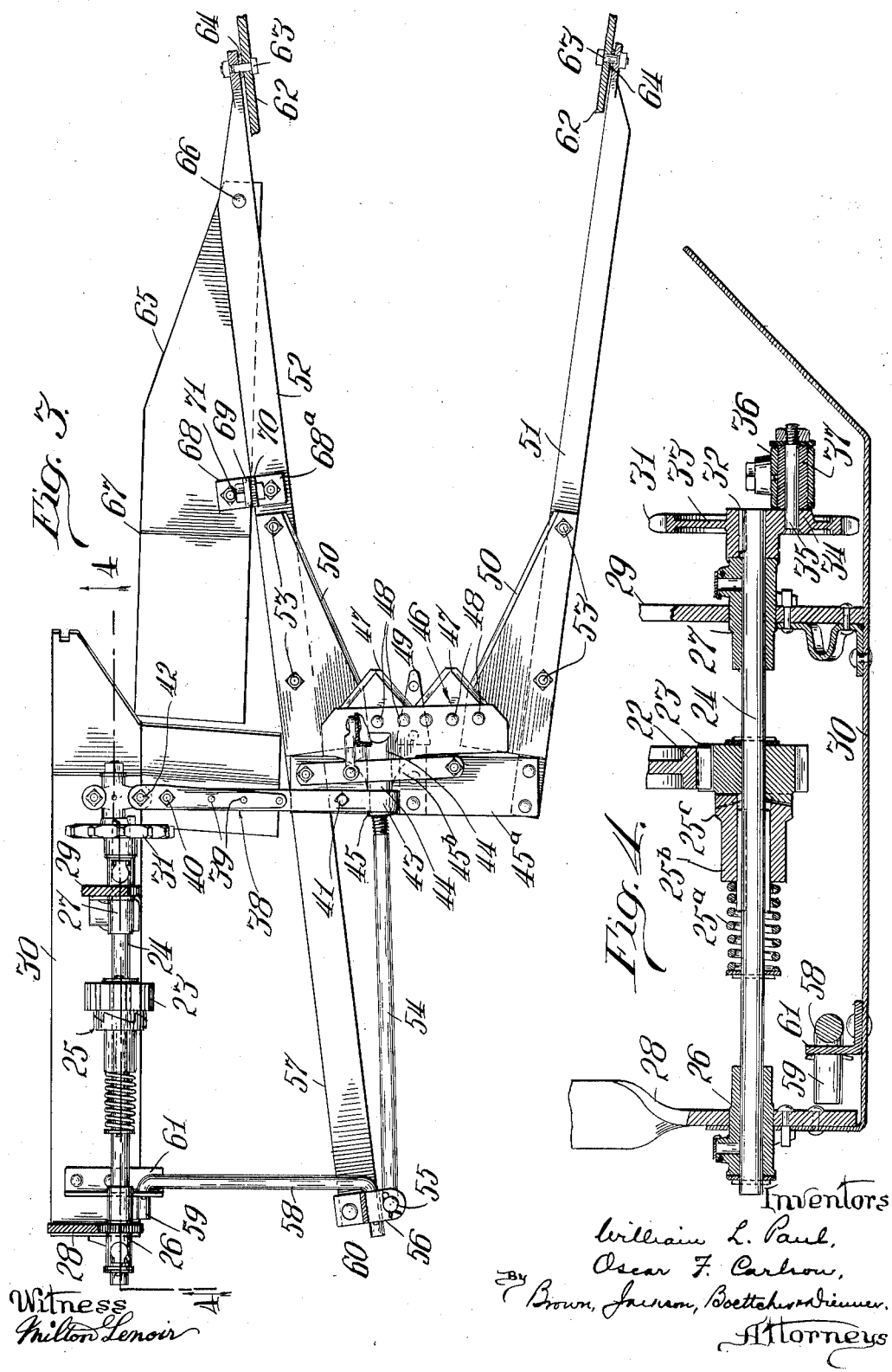
June 6, 1933. W. L. PAUL ET AL 1,912,998
STALK CUTTING MECHANISM FOR CORN HARVESTERS
Filed May 14, 1928 3 Sheets-Sheet 3

Patented June 6, 1933

1,912,998

UNITED STATES PATENT OFFICE

WILLIAM L. PAUL, OF BERKELEY, CALIFORNIA, AND OSCAR F. CARLSON, OF MOLINE, ILLINOIS, ASSIGNORS TO DEERE & COMPANY, OF MOLINE, ILLINOIS, A CORPORATION OF ILLINOIS

STALK CUTTING MECHANISM FOR CORN HARVESTERS

Application filed May 14, 1928. Serial No. 277,527.

This invention relates to corn harvesters and, more particularly, to means for permitting low cutting of the corn and means cooperatively combined and associated therewith for giving a uniform and complete cutting of the corn stalk, even when the harvester may be slowed down.

The object of our invention is to provide a corn harvester with a sickle bar mounted in such a manner that it has full floating action, and is automatically raised and lowered by the contour of the ground adjacent the corn row, so that the corn may be cut close to the ground level.

Another object of our invention is to provide inertia means associated with the sickle bar, so that when the sickles or knives cut into the lower woody portion of the stalk or even into the soil, retardation will be prevented and, at the ends of rows where the harvester is slowing up preparatory to turning, the knives will continue to operate rapidly and effectively to completely cut all the corn clean at a uniformly low level and will not uproot the same.

In order to successfully combat the insect commonly known as the corn borer, it has been found necessary to cut the corn at or near the level of the ground, since the corn borer lives in the corn stalk, at or near the first joint thereof. We are aware of the fact that means have been employed, whereby the height of the sickle bar may be adjusted, but difficulty has been experienced in adjusting the sickle bar relatively close to the ground, for the reason that corn fields are not perfectly level and when the wheels drop into a slight depression, the cutting knives dig into the ground and when the wheels pass over a knoll, the knives cut the corn stalk too high above the ground to successfully combat the corn borer.

We have overcome this difficulty by employing means for constantly and automatically varying the height of the sickle bar as the contour of the ground along the corn row varies. We preferably employ an arrangement whereby the entire cutting mechanism floats on the soil, and is thus independent of any fixed adjustment.

For the purpose of preventing retardation of the cutting knives and insuring clean cutting at the end of the row, we preferably employ an overrunning fly-wheel so arranged that its momentum will drive the cutting knives after the harvester is slowed up, or even stopped.

In order that others may understand and be able to employ the same, we have shown in the accompanying drawings a specific illustration embodying our invention.

In the drawings:

Figure 1 is a plan view of a corn harvester, with parts omitted for showing more clearly the application of our invention thereto;

Figure 2 is a vertical section, taken on substantially the line 2—2 of Figure 1;

Figure 3 is an enlarged detail view of a portion of that shown in Figure 1; and

Figure 4 is a sectional view, taken on the line 4—4 of Figure 3.

The corn harvester shown in Figure 1 comprises a main frame 5 having a forwardly extending draw bar 6 pivotally secured to the frame by bolts 7, and adapted to be drawn by a tractor or other suitable power means. The wheels 8 and 9 support the frame 5, by means of suitable axles and bearings in the well-known manner, but the construction and arrangement thereof is not involved in this invention and the detailed description thereof will be omitted.

The wheel 8 drives the bevelled gear 18 through the medium of sprocket 19, which is rigid with respect to the wheel 8, chain 10, sprocket 11, clutch 12, shaft 13, sprocket 14, chain 15, sprocket 16, and shaft 17 on which the gear 18 is mounted. The gear 18 drives pinion 20, which, in turn, rotates shaft 21, on which it is secured. A gear 22 on the forward end of shaft 21 rotates therewith and drives gear 23 and shaft 24 through the medium of a clutch 25, best illustrated in Figures 3 and 4.

The clutch 25 is preferably of the spring-pressed type, comprising a compression spring 25$^a$ engaging the rear end of the sleeve 25$^b$ splined on the shaft 24, and adapted to have longitudinal movement thereon.

The forward end 25ᶜ of the sleeve is enlarged and notched for driving engagement with an oppositely notched portion 23ᵃ on the gear 23 and arranged to slip or overrun when shaft 24 is rotated faster than gear 23.

Shaft 24 is journalled in bearings 26 and 27, mounted in upwardly extending frame members 28 and 29 and, as shown in Figure 4, a guard plate 30 is positioned therebeneath for keeping dirt out of the gears and bearings and for preventing breakage of the same by contact with rigid objects, such as rocks. On the forward end of shaft 24, is secured a sprocket 31, by means of a feather 32. The web 33 of said sprocket is thickened at 34 and, through this portion, a bolt 35 is passed, for securing a driving connection 36 on the bushing 37, all of which are eccentrically mounted on the sprocket wheel 31.

A pitman rod 38, composed of a plurality of members rigidly secured together, as by rivets 39 and bolts 40 and 41, has one end secured by bolt 42 to the eccentrically mounted driving connection 36, such that limited pivotal movement may be had, forwardly and rearwardly.

The other end 43 of the pitman is secured for oscillatory movement about the thrust head 44 of the sickle bar which is provided with a guide flange 45 for engagement with the rear side of the end 43 of the pitman. The cross-bar 45ᵃ secures the arms 51 and 52 rigidly together and a guide bar 45ᵇ passes over the part 44 for securing the movable knives in engagement with knives 50.

The thrust head is rigidly secured to, or may be an integral part of, the sickle bar 46, to which are secured knives or sickles 47, by means of rivets 48, as shown in Figure 3. Cutting of corn stalks is accomplished by the scissor-like action of the sickles with the central guard 49 and the two stationary knives 50 secured to the gathering arms 51 and 52 by bolts 53.

A thrust bar 54 has threaded engagement with the thrust head 48 for rigidly securing the members together. The rear end 55 of bar 54 is turned upwardly and passes through a lug 56, rigidly secured to the rear end 57 of the gathering arm 52 in any suitable manner. A link member 58 has rearwardly turned ends 59 and 60 engaging, respectively, a portion 61 of the frame and the lug 56 on the rear end of arm 52. This arrangement permits vertical oscillation of the arm 52 about the portion 59 as an axis, but lateral movement is prevented.

The forward ends of arms 51 and 52 are pivotally secured to members 62, which are rigid with respect to the frame of the harvester, by means of bolts 63 and spaced therefrom by washers 64, so that the arms may float and oscillate vertically on the bolts 63 as an axis. In this connection, it will be understood that sufficient lost motion is provided for in the pivots to prevent binding or stiff operation.

A sled or soil shoe 65 is bolted to the arm 52 at 66, and the same is arranged in a downwardly sloping position to a point 67 from which point rearwardly it extends parallel with the ground and is arranged to slide thereon for raising and lowering the knives 47 and 50 as the surface of the soil varies.

In order that the height at which the shoe 65 will hold the knives above the ground may be predetermined, adjusting means have been provided which comprise two angle plates 68 and 68ᵃ bolted to the shoe 65 and the arm 52, respectively, and having their upwardly extending flanges 69 and 70 facing and engaging each other. Said members 69 and 70 are perforated for the accommodation of a bolt 71 in any of a plurality of adjusted positions, as may be desired.

The sprocket 31 is provided with a chain 72 which drives a smaller sprocket 73 on the counter shaft 74 which is journalled in bearings 75 and 76 mounted on the frame 5. On the forward end of shaft 74, a relatively heavy fly-wheel 78 is rigidly secured for rotation therewith. From the foregoing description, it will be readily understood that when the harvester is moved forwardly, the wheel 8 is caused to rotate, which, through the system of gears and chains, rotates shaft 24 and reciprocates the sickle bar.

The clutch 25 is arranged to drive the shaft in a direction corresponding with the forward movement of the harvester, and the fly-wheel 78 will be driven through the medium of the chain 72 and the countershaft 74. When, however, the forward movement of the harvester and, consequently, the rotation of pinion gear 23 is retarded, the momentum of the fly-wheel 78 continues to rotate at substantially constant speed, so that it drives shaft 34 and the sickle bar without substantial retardation, it being understood that the clutch 25 slips during this latter action.

The utility of this overrunning fly-wheel arrangement, combined with the floating sickle and entire cutting mechanism, will be readily apparent to those skilled in the art, since by low cutting, the tough parts of the stalk are engaged by the knives and the fly-wheel drives the knives at a constant speed, whereas, by prior construction, there would be a constantly jerking action of retardation and acceleration. By our combination, the corn is cut clear at the ends of rows, whereas the prior construction would cut, uproot, and break down some of the stalks when the harvester was retarded.

While we have described a specific embodiment of our invention, we do not intend to be limited to the details herein set forth, but desire to avail ourselves of such variations and modifications as come within the scope of the appended claims.

We claim as our invention:

1. In a corn harvester, the combination of corn cutting mechanism arranged to float as a unit on the soil, a soil sled for said mechanism, said mechanism comprising gathering arms pivotally secured to the harvester frame, a sickle bar supported by said arm and having movable cutting knives thereon, a traction wheel having an operative connection with said sickle bar, a thrust rod for said sickle bar, inertia means operatively connected with said sickle bar for driving the same when the traction wheel is retarded.

2. In a corn harvester, the combination of corn cutting mechanism arranged to float as a unit on the soil, means secured thereto arranged to engage the soil and support said mechanism, said mechanism comprising gathering arms pivotally secured to the harvester frame, and a sickle bar having reciprocatory cutting knives thereon, a thrust rod for said sickle bar, a rearward extension on one of said arms having means thereon to which said thrust rod is pivotally secured, and traction means for operating said sickle bar.

3. In a corn harvester, the combination of corn cutting mechanism arranged to float as a unit on the soil, said mechanism comprising gathering arms pivotally secured to the harvester frame, stationary knives on said arms, movable knives engaging said stationary knives, a sickle bar for said movable knives, a soil sled for supporting said mechanism, a thrust rod for said sickle bar, a rearward extension on one of said arms having means thereon pivotally connected with said thrust rod, and traction means operatively connected with said sickle bar.

4. A corn harvester comprising in combination a traction wheel, a fly-wheel operatively connected thereto, a pitman rod operatively connected to said traction wheel and said fly-wheel, a clutch arranged to disconnect said traction wheel from said fly-wheel and said pitman rod when said traction wheel is retarded and permitting said fly-wheel to drive said pitman rod, corn cutting mechanism arranged to float as a unit on the soil, said mechanism comprising a pivoted frame and a soil sled therefor, stationary knives on said frame, movable knives engaging said stationary knives, said movable knives being secured to a sickle bar, a thrust head on said sickle bar engaged and actuated by said pitman rod, a thrust bar engaging said thrust head and arranged to oscillate therewith, and a link securing the rear end of said thrust rod from lateral movement relative to the harvester frame.

5. An agricultural implement comprising a frame, a sickle supported thereon for reciprocatory movement, a thrust member connected with the sickle and extending therefrom substantially at right angles, means pivotally connecting the thrust member with the said frame, and means for reciprocating said sickle.

6. An agricultural implement comprising a frame, a sickle supported thereon for reciprocatory movement, a thrust rod connected with the sickle and extending rearwardly therefrom and having pivotal connection with said frame, a pitman connected with the sickle and extending substantially at right angles to said thrust rod, and means for reciprocating said pitman.

7. A harvester comprising a frame, a sickle supported for movement relative to the frame, a thrust member rigidly connected near one end with the sickle and pivotally connected near the other end with said frame, and means for oscillating said sickle.

8. A harvester comprising a frame, a sickle supported for movement relative thereto, a thrust member rigidly connected near one end with the sickle and extending rearwardly therefrom at substantially a right angle, means pivotally connecting the other end of said thrust member with said frame, and means for oscillating said sickle.

9. A harvester comprising a frame, a sickle supported thereon for reciprocatory movement and including a thrust head rigidly connected therewith, a thrust member connected at one end with said thrust head and pivotally connected at the other end with said frame, a pitman connected with said thrust head, and means for reciprocating said pitman.

10. A harvester comprising a frame, a sickle supported thereon for reciprocatory movement and including a thrust head rigidly associated therewith, a thrust member connected at one end with said thrust head and extending rearwardly therefrom at substantially right angles with respect to the sickle, the thrust member being pivotally connected at its rear end with said frame, a pitman connected with said thrust head and extending substantially at right angles with respect to said thrust member, and means for reciprocating said pitman.

11. A harvester comprising a frame, a sickle supported thereon for reciprocatory movement and having a thrust head rigidly connected therewith, a thrust rod having threaded connection with said thrust head and extending rearwardly from the sickle, said thrust rod having its rear end bent at right angles and pivotally connected with said frame, a pitman connected with said thrust head for reciprocating said sickle, and means for reciprocating said pitman.

12. A harvester comprising a main frame, an auxiliary frame movably connected with the main frame, a sickle supported on the auxiliary frame for reciprocatory movement relative thereto, a thrust rod connected with the sickle and extending rearwardly therefrom and having pivotal connection with the rear portion of said auxiliary frame, a pitman connected with the sickle and extending toward the main frame substantially at right angles to said thrust rod, and means carried by the main frame for reciprocating said pitman.

13. A harvester comprising a main frame, an auxiliary frame movably connected therewith, a sickle supported on the auxiliary frame for reciprocatory movement relative thereto, a thrust member connected with the sickle near one end and pivotally connected near the other end with said auxiliary frame, a link member connecting the auxiliary frame with said main frame, a pitman connected with the sickle and extending toward the main frame substantially in parallelism with said link member, and means carried by the main frame for reciprocating said pitman.

14. A harvester comprising a main frame, an auxiliary frame, means pivotally connecting the front end of the auxiliary frame with the main frame, a link member connecting the rear portion of the auxiliary frame with the main frame, a sickle supported on the auxiliary frame for reciprocatory movement, a thrust member connected with the sickle and extending rearwardly therefrom and having pivotal connection with the auxiliary frame adjacent the connection with said link member, a pitman connected with the sickle and extending toward the main frame in substantial parallelism with respect to said link member, and means carried by the main frame for reciprocating said pitman.

In witness whereof, we hereunto subscribe our names this 7th day of May, 1928.

WILLIAM L. PAUL.
OSCAR F. CARLSON.